(12) United States Patent
Khan et al.

(10) Patent No.: US 6,263,316 B1
(45) Date of Patent: Jul. 17, 2001

(54) AUTOMATED PROCESS FOR RETAILING TO A VEHICLE OCCUPANT

(75) Inventors: Zafar Khan, Newton; Melissa Chadwick, Cambridge, both of MA (US)

(73) Assignee: Momente, LLC, Cambridge, MA (US)

( * ) Notice: Subject to any disclaimer, the term of this patent is extended or adjusted under 35 U.S.C. 154(b) by 0 days.

(21) Appl. No.: 09/241,998

(22) Filed: Feb. 2, 1999

(51) Int. Cl.[7] ............................ G06F 17/60; G07B 15/02
(52) U.S. Cl. ............................. 705/13; 705/13; 705/65; 705/418; 705/41; 705/1; 235/375; 235/381; 235/384; 380/4; 380/24; 380/28; 380/262; 340/825.31; 340/825.32; 186/35
(58) Field of Search .................... 705/65, 418, 1, 705/41; 235/375, 381, 384; 340/825.31, 825.35; 186/53; 52/79.1, 33; 380/4, 24, 262, 28

(56) References Cited

U.S. PATENT DOCUMENTS

| 3,647,026 | * | 3/1972 | Alexander et al. | 186/53 |
|---|---|---|---|---|
| 5,101,200 | * | 3/1992 | Swett | 340/937 |
| 5,310,999 | * | 5/1994 | Claus et al. | 235/384 |
| 5,602,919 | * | 2/1997 | Hurta et al. | 705/65 |
| 5,727,352 | * | 3/1998 | Bared et al. | 52/79.1 |
| 5,819,234 | * | 10/1998 | Slavin et al. | 705/13 |

FOREIGN PATENT DOCUMENTS

| 689169 | * | 12/1995 | (EP) . |
|---|---|---|---|
| 759600 | * | 2/1997 | (EP) . |
| 577328 | * | 9/1998 | (EP) . |
| 969419 | * | 1/2000 | (EP) . |
| 982685 | * | 3/2000 | (EP) . |

OTHER PUBLICATIONS

Elizabeth McCarthy, "Home on the Road—What Some Folks Do While Behind The Wheel Is Enough To Drive You Crazy," Chicago Tribune, Southwest Final;SW, Nov. 6, 1994, p. 1.
Mitchell, Rechard "Gentlemen prefer prepaid cards", Credit Card Management v8n1, Apr. 1995.*
"Vending machine drinks ordered by mobile phone", Euromarketing via E–mail, v III, n17, Feb. 4, 2000.*
"Experts Ask: What Is The Value Of Stored–Value?", Bank Network News, v15, n18, Feb. 11, 1997.*
"Fast Movers", CardFAX, v98, n143, Jul. 14, 1998.*
"Visa Chip–based stored value card products offer cash alternative to consumers", M2 Presswire, Mar. 27, 1995.*
"Smart Cards Are Getting a Lot Smarter", Wall Street Journal 3 Star, Eastern Edition, Jun. 26, 1989.*

* cited by examiner

Primary Examiner—James P. Trammell
Assistant Examiner—Nga Nguyen
(74) Attorney, Agent, or Firm—Cesari and McKenna (57) ABSTRACT

The invention is a method and apparatus for the automated retailing of refreshments and other basic consumer products to a vehicle occupant as the vehicle passes through a toll station having an automated payment capability. Examples of such toll stations include electronic toll collection (ETC) tollbooths and parking facilities. In each case, product charge is added to, or bundled with, the toll charge and payment is automatically rendered, typically via an electronic debit from a pre-paid account, or an electronic charge to a consumer credit account.

17 Claims, 8 Drawing Sheets

AUTOMATED PROCESS FOR RETAILING TO A VEHICLE OCCUPANT

FIELD OF THE INVENTION

This invention relates generally to the integration of a retail product transaction with a toll transaction.

BACKGROUND OF THE INVENTION

Often during the course of travel a driver, and/or other vehicle occupants, may desire a refreshment or travel aid. The driver must detour the vehicle into a rest stop or a road-side business and, in most cases, must also park and exit the vehicle to obtain a refreshment. For instance, although conventional vending machines are commonplace at travel stops and are also easy-to-use, they are designed for the pedestrian customer and cannot be accessed by the driver from within a vehicle. Some businesses, such as fast-food restaurants, may dispense their products through a drive-through window service wherein an employee takes the order, accepts the payment, and delivers the goods. However, despite the use of advance ordering techniques, these employee-intensive transactions, when combined with the cost and complexity of a typical order, are time-consuming. As a result, a driver seeking a simple refreshment during travel must suffer either an inconvenience or a travel delay, and sometimes both.

Therefore, what is needed is a system to provide the driver, and other vehicle occupants, with a quick and convenient means for purchasing refreshments and other basic consumer products for use in the course of travel. Such a system should operate under the constraints of traffic safety, space limitations, driver interfacing, and high vehicle volume and throughput.

SUMMARY OF THE INVENTION

The invention is a method and apparatus for the automated retailing of refreshments and other basic consumer products to a vehicle occupant as the vehicle passes through a toll station having an automated payment capability. Examples of such toll stations include electronic toll collection (ETC) tollbooths and parking facilities. In each case, the refreshment charge is added to, or bundled with, the toll charge and payment is automatically rendered, typically via an electronic debit from a pre-paid account, or an electronic charge to a consumer credit account. The invention thus combines two non-related transactions into a single unified transaction. This is particularly useful for customers who pass through a toll station and are therefore benefited by the time-saving features of a unified transaction.

In the preferred embodiment, the invention is incorporated into a toll station equipped with an ETC system. The ETC system utilizes an automatic vehicle identification (AVI) system to automatically identify a prepaid electronic account. The AVI system is typically deployed at the entry to a toll lane and communicates with a transponder which is carried with the vehicle and transmits an electronic account number when prompted by the AVI system. Signage in advance of, and/or at the entrance to, the toll lane indicates the available products. Preferably, a vehicle occupant places a remote order for one or more products prior to vehicle entry into the toll lane, through a transponder modified to accept a product order. The order transponder is activated upon entry into the toll lane and transmits the remote product order, together with the account number. After the primary transaction system validates the account number by checking it against a list of numbers having valid accounts, the cost of the product order is added to the primary charge and payment is rendered by an electronic debit to the prepaid account. A product dispenser, typically located within the toll lane, dispenses the ordered product(s) within reach of the driver of the vehicle.

In the cases where remote ordering is neither desirable or available, an occupant of the vehicle, typically the driver, may alternatively place a product order at an ordering interface located within the toll lane. Furthermore, in the cases where an AVI system is not employed, the automated payment may be accomplished by a variety of different methods, including credit card, debit card, or smart card. And, in certain situations, such as at highway toll lanes, the product dispenser may be located outside of the toll lane to prevent vehicle congestion.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
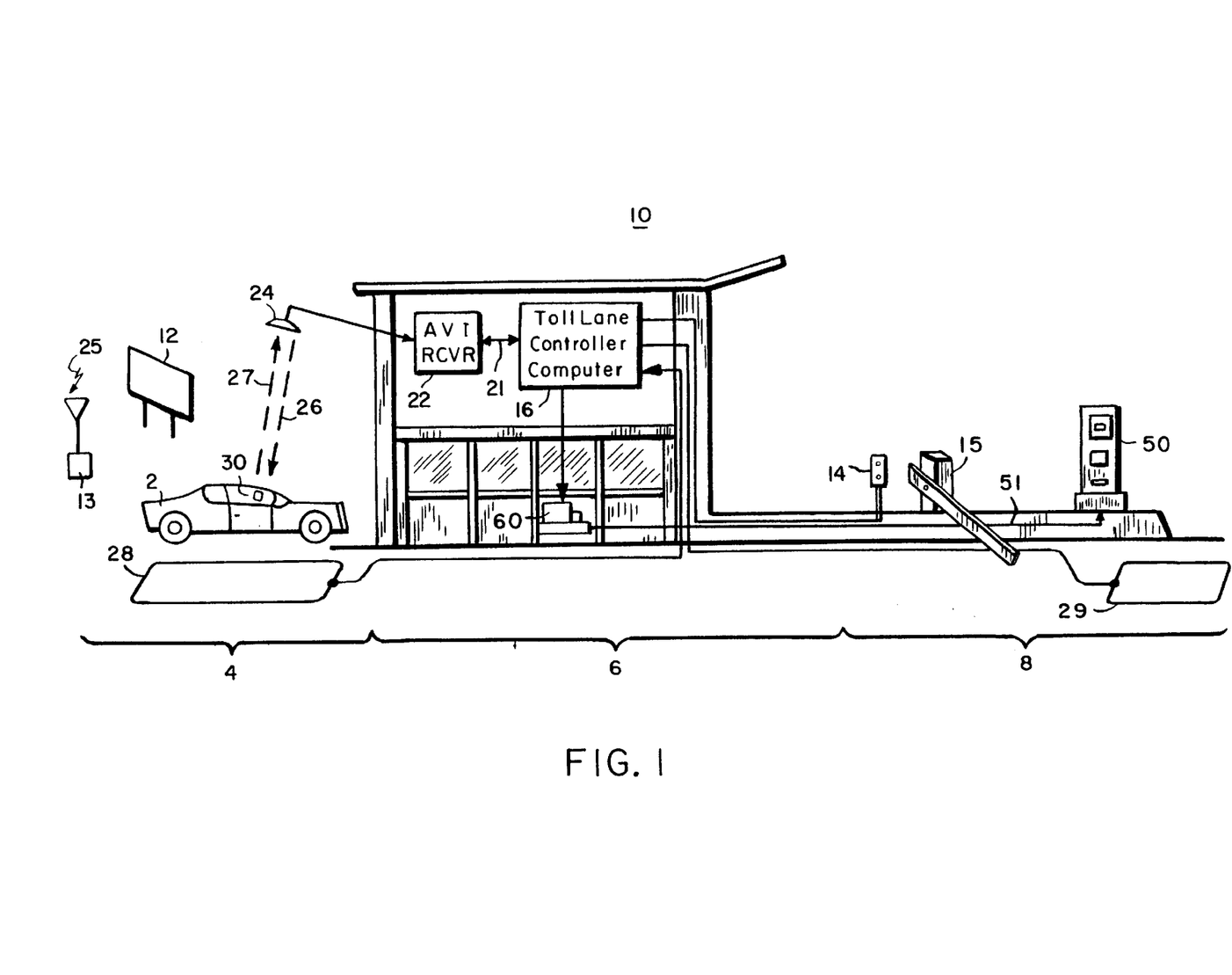
FIG. 1 is an illustration of an ETC toll lane incorporating the invention.

FIG. 1 illustrates an electronic toll collection (ETC) toll lane 10 incorporating the invention. The ETC toll lane 10 may be a part of a toll plaza comprising one or more ETC toll lanes, any number of which may be configured to provide for drive-through purchasing and dispensing of refreshments and basic consumer products consumed in the course of travel, in addition to the collection of tolls. Examples of these products include soft drinks, coffee, snacks (candy bars, gum, life-savers, etc.), water, aspirin, toiletries (tissue, wipes, etc.), lottery tickets, and travel entertainment (games, puzzles, etc.).

The ETC toll lane 10 has an entrance area 4, a transaction area 6, and an exit area 8. The AVI system identifies an approaching vehicle 2, or, more precisely, identifies an electronic account from which the toll charge is to be debited. Specifically, an activation signal 26 is transmitted from an AVI antenna 24 to the vehicle 2 as it proceeds into the entrance area 4. A transponder 30 placed on, or within, the vehicle 2 returns an identification signal 27 to the AVI antenna 24 upon activation. The identification signal 27 is processed by an AVI transceiver 22 to produce an ETC account number.

The AVI transceiver 22 connects to a toll lane controller computer (lane controller) 16 via a signal interface 21. The AVI transceiver 22 forwards the ETC account number to the lane controller 16 which validates the number by checking it against a list of numbers having valid ETC accounts. This list may be stored at some remote location which the lane controller 16 can access when needed, or may be downloaded to the lane controller 16 on a daily basis. The lane controller 16 may signal the driver of the vehicle 2 by an indicator 14, or in some other manner, as to whether or not the ETC account is valid. The ETC toll lane 10 may also include a gate mechanism 15 to prevent passage of the vehicle 2 until the toll payment is rendered. In some configurations, as the driver forwards the vehicle 2 through the entrance area 4, a first axle-auditing mechanism 28, such as an audit treadle or light curtain, may be used to detect vehicle entry into the toll lane and also count the number of axles (e.g. a vehicle may be pulling a trailer for which an extra amount is added to the toll). The lane controller 16, which is connected to the mechanism 28, may use the axle count in toll charge calculations.

Figure 2:
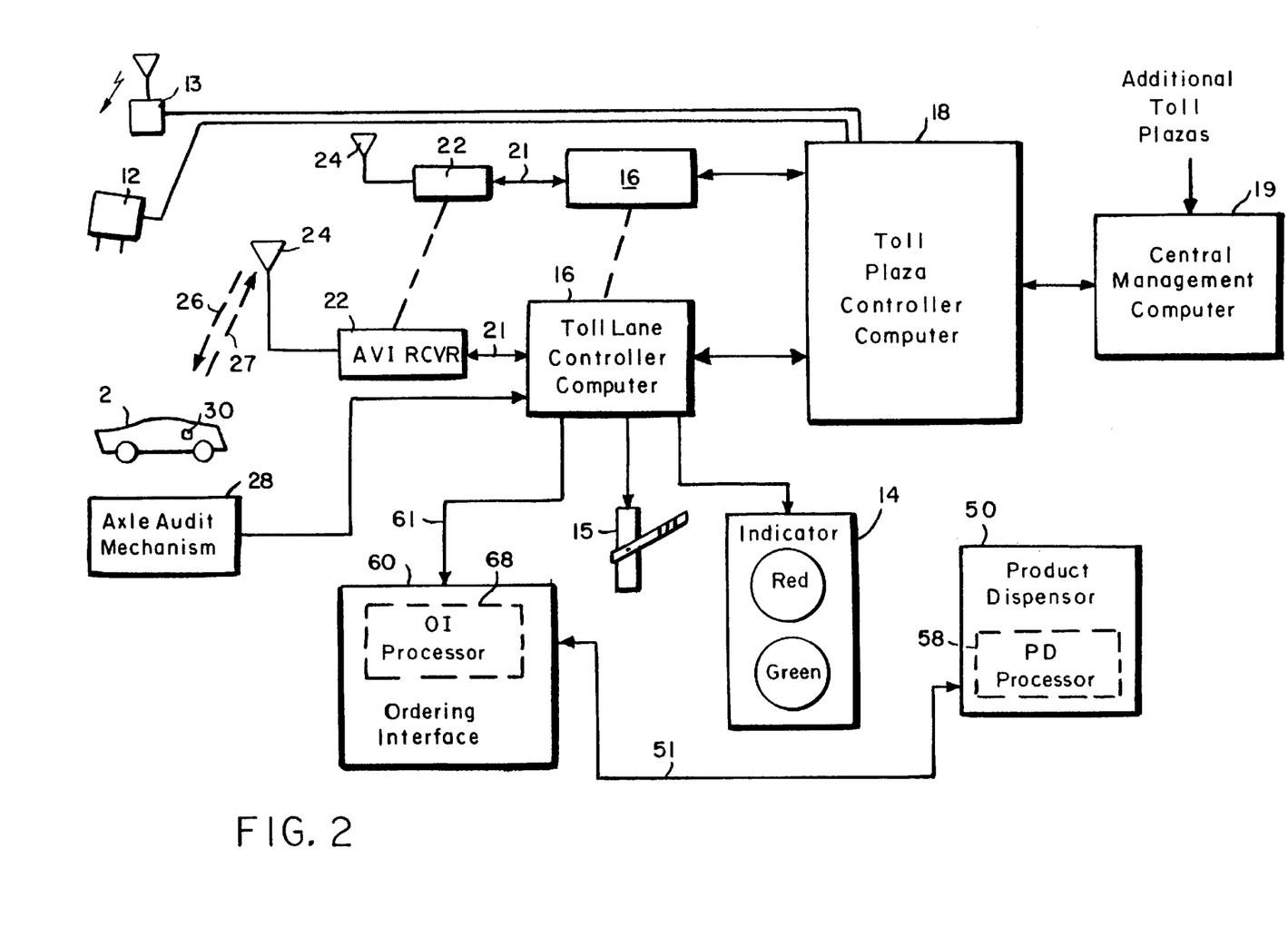
FIG. 2 is a block diagram of an ETC toll system incorporating the invention.

FIG. 2 is a block diagram of the inventive automated retailing system implemented in one or more ETC toll lanes of a toll plaza. A toll plaza controller computer (plaza controller) 18 coordinates the operation of the lane controllers 16. In particular, the plaza controller 18 manages communication between the lane controllers 16 and a central management computer 19. The central management computer 19 may maintain a data base of ETC accounts and perform the electronic toll debits.

Signage is used to indicate the products available for purchase at the toll plaza, as well as the availability of the service in certain toll lanes. It is typically positioned within the toll lane entrance area 4 and may also be located in advance (e.g., ½ mile to 1 mile) of the toll plaza. Preferably, electronic signage 12 under the control of the plaza controller 18 is employed so that product and toll lane availability may be readily updated.

The driver, or another vehicle occupant, enters the product order into a modified transponder that is carried with the vehicle 2. An example of such a modified transponder is the hand-held class III read/write/input modulated backscatter (reflective) or active transmitter order/ETC transponder 31 illustrated in FIG. 3. The order/ETC transponder 31 includes product selection buttons 32, a display screen 34, a "transaction complete" button 36, a "transaction cancel" button 37, one or more status indicators (e.g., "transmit" LED 38), a speaker 39, and internal circuitry (not shown) comprising a processor and associated memory. Those skilled in the art will recognize that the order/ETC transponder may be equipped with an alternative means for the entry of a product order, such as a voice activation and recognition system to permit voice entry of a product order. The order/ETC transponder 31 transmits the identification signal 27 along with a product order signal (also indicated by dashed arrow 27).

Figure 3:
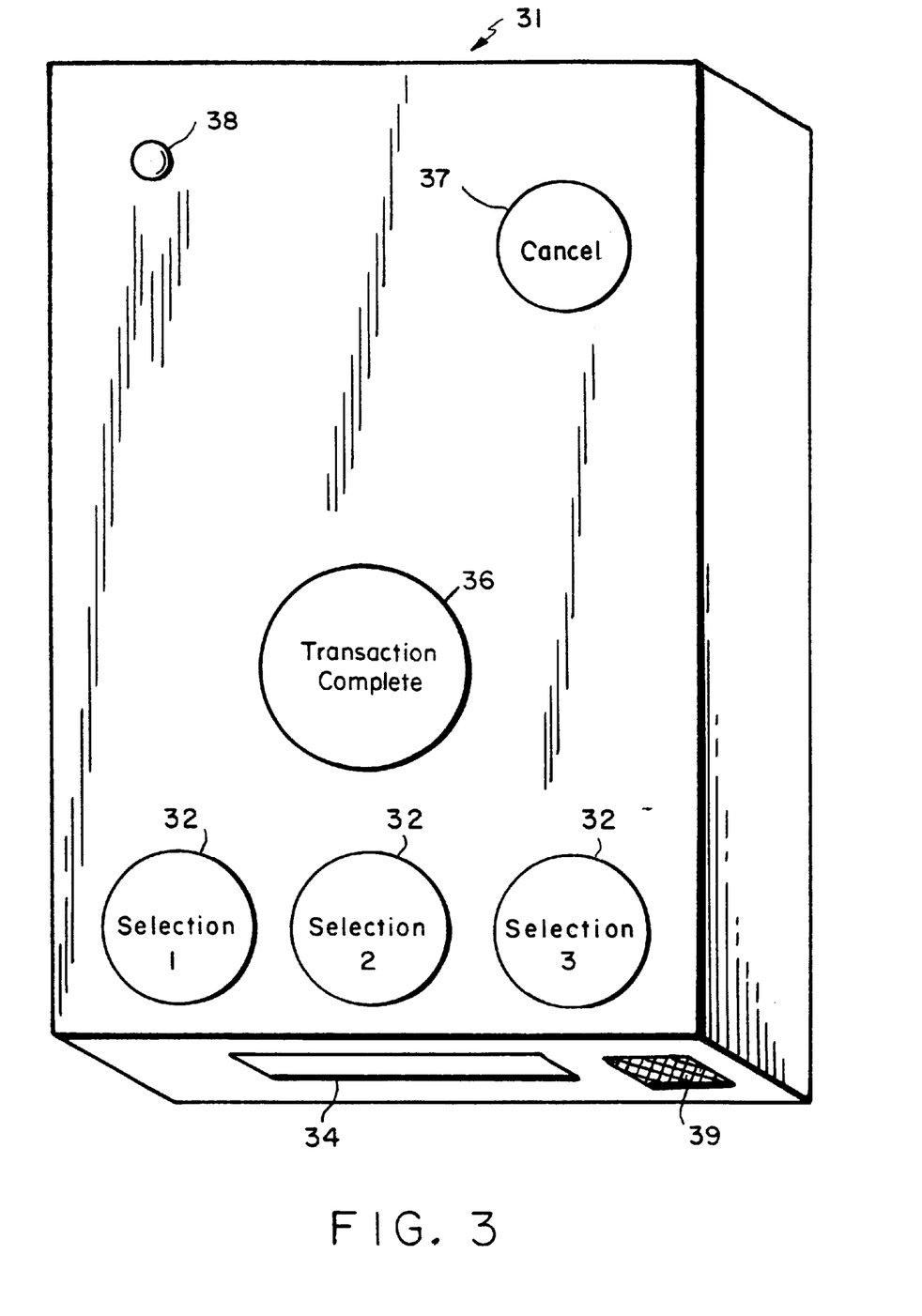
FIG. 3 is an illustration of a remote order transponder.

In addition to the electronic signage 12, one or more AVI alert transmitters 13 may also be deployed at advanced locations for transmission of an alert signal 25 to the order/ETC transponder 31 of an approaching vehicle 2. Each AVI alert transmitter 13 may also be connected to and controlled by the plaza controller 18. Upon receipt of the alert signal 25, the order/ETC transponder 31 may alert the driver of an upcoming product retailing area by producing an audio tone or message at the speaker 39. In addition to the alert signal 25, the AVI alert transmitter 13 may also transmit product availability information that may be indicated to the driver via the display screen 34.

An ordering interface 60, described in greater detail below, is located within the transaction area 6 and may also be integrated with a toll ticket dispenser/reader, a coin/token collection mechanism, or similar toll function. The ordering interface 60 includes an ordering interface (OI) processor 68 and associated memory (not shown). The OI processor 68 is responsible for executing and/or monitoring the execution of the steps of the below-described automated retailing flow diagrams. In particular, it connects via a signal interface 61 to the lane controller 16 to provide for the integration of the automated retailing flow steps into the conventional toll lane functions of traffic signaling, axle-auditing, toll charge collection, and gate operation.

Preferably, the product order is dispensed to an occupant of the vehicle 2, typically the driver, at a product dispenser 50, although in certain situations where the dispenser 50 may not be available, a toll attendant may dispense the products. The dispenser 50 located within the exit area 8, or in some cases, away from the ETC toll lane 10 to avoid vehicle congestion. It includes a product dispenser (PD) processor 58 and associated memory (not shown). The PD processor 58 is responsible for executing one or more steps of the automated retailing flow diagrams discussed below. The OI processor 68 connects to the PD processor 58 via a signal interface 51 to control the dispensing of products and to monitor operation of the dispenser 50. The dispenser 50 is also discussed below in more detail.

Figure 4A:
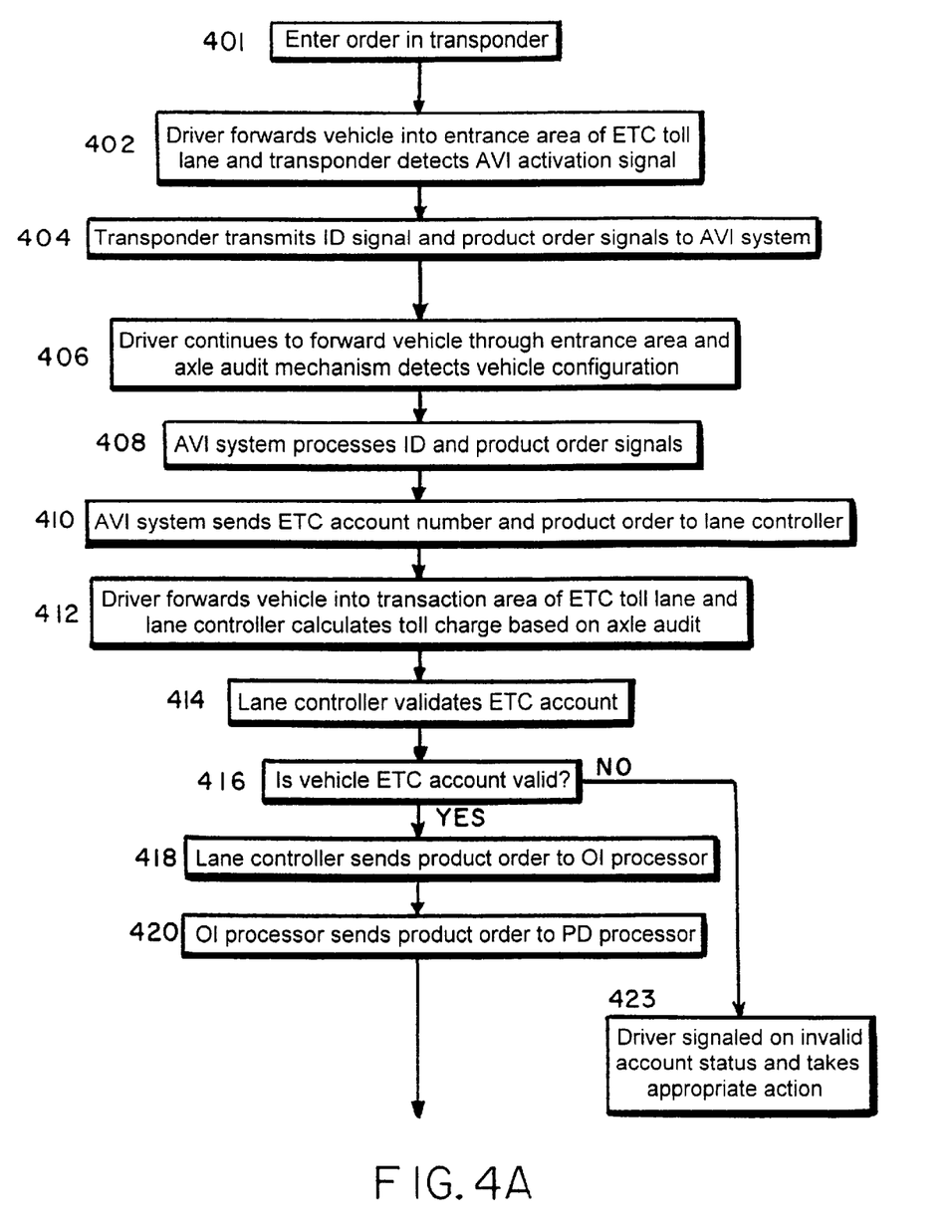
FIG. 4 is flow diagram of an automated retailing procedure for remote order entry at an ETC toll lane.
Figure 4B:
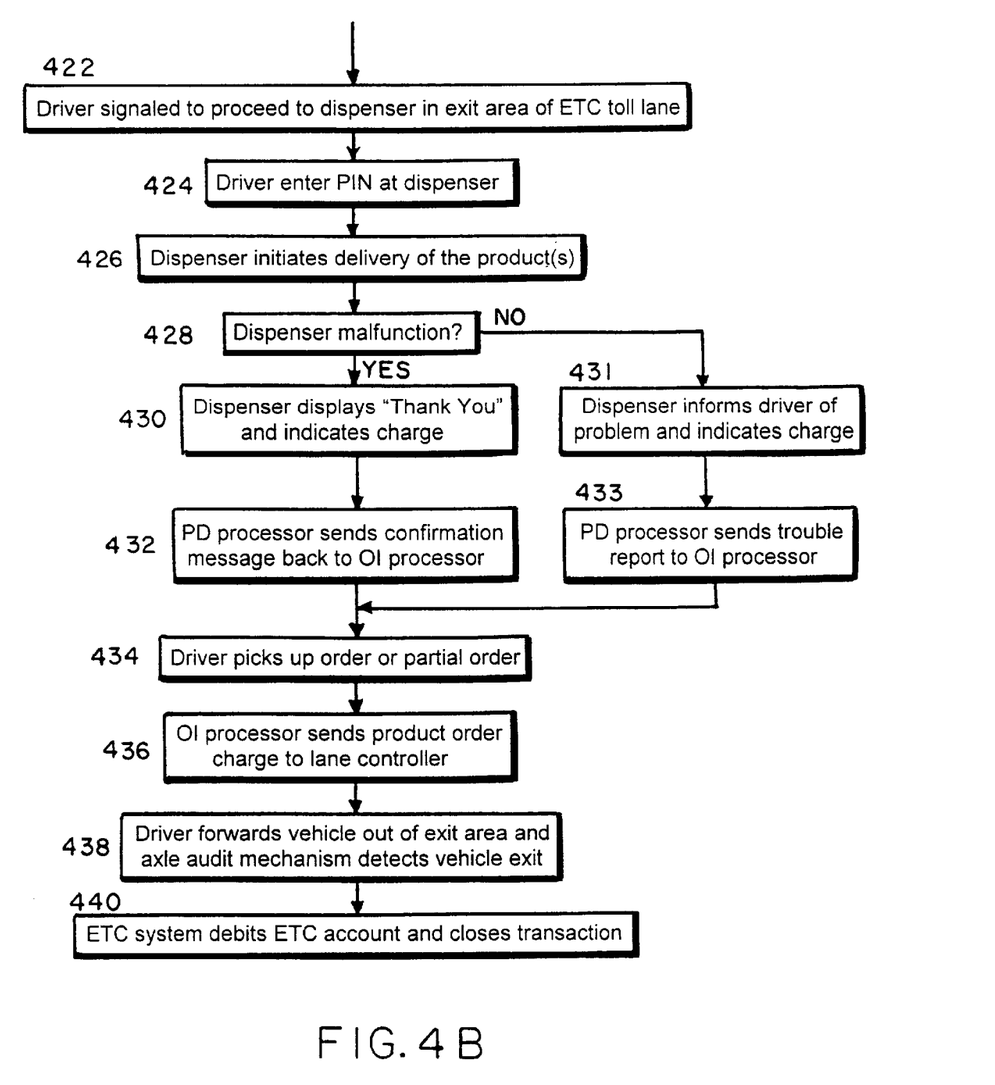

FIG. 4 is a flow diagram of the automated retailing procedure executed at the ETC toll lane 10 when the product order is remotely entered via the order/ETC transponder 31. As noted above, certain steps, such as entry of a remote order, may be performed by any occupant of the vehicle 2. In addition, the person responsible for the ETC account need not be an occupant of the vehicle 2. For simplicity, however, we assume in the flow diagrams presented herein that the driver is the lone occupant of the vehicle 2 and, furthermore, that the driver is the person responsible for the ETC account. In step 401, the driver of the vehicle 2 orders one or more products by depressing the associated product buttons 32 on the order/ETC transponder 31 an appropriate number of times to reflect the desired quantity. (To maximize vehicle throughput, the total order quantity may be limited to a predetermined amount, such as four soft drink cans.) The order is indicated on a display 34. The driver then confirms the order by depressing the "transaction complete" button 36, and the order is then stored in the memory until it is transmitted to the AVI system upon entry into the toll lane entrance area 4. Depression of the "transaction cancel" button 37 clears the order out of memory, thereby preventing its transmission upon vehicle entry into the toll lane entrance area 4, and also allows the entry of a new order. The "transmit" LED 38 indicates that an order is stored in memory and will be transmitted upon vehicle entry into the toll lane. Those skilled in the art will recognize that alternative means for account identification and remote ordering may be employed. For example, an account number and product order may be sent to an AVI-type system via a paging device, a cellular telephone, an onboard computer with transmission capabilities, etc. Such means may also include the capability for receiving and processing the above-described alert signal 25.

In step 402, as the driver forwards the vehicle 2 into the toll lane entrance area 4, the order/ETC transponder 31 detects the activation signal 26 transmitted by the AVI system. In step 404, the order/ETC transponder 31 transmits, and the AVI transceiver 22 receives, the identification and product order signals 27. The order/ETC transponder speaker 39 may produce an audible tone or message to indicate that the order has been transmitted. In step 406, as the driver continues to forward the vehicle 2 through the entrance area 4, a first axle audit mechanism 28 is employed to detect toll lane entry of the vehicle 2 and vehicle configuration, i.e. the number of axles. In the meantime, in step 408, the AVI transceiver 22 processes the received signals 27 and, in step 410, the AVI transceiver 22 forwards an ETC account number and the retail product order to the lane controller 16.

In step 412, as the driver forwards the vehicle 2 into the transaction area 6, the lane controller 16 calculates the toll charge based on the vehicle configuration. In step 414, the lane controller 16 attempts to validate the ETC account number by comparing the number against a list of numbers having valid ETC accounts. If the ETC account number is found valid in decision step 416, the lane controller 16 forwards the ETC account number, the toll charge amount, and the product order to the OI processor 68 in step 418. In step 420, the OI processor 68 transmits a dispenser control signal to the PD processor 58. The dispenser control signal identifies the ordered products and their quantities. In step 422, the driver is signaled via indicator 14 to proceed to the dispenser 50.

The dispenser 50 is preferably located in the exit area 8 approximately two car lengths beyond the indicator 14. In some configurations the dispenser 50 may be located proximate with the ordering interface 60, while in other configurations it may be situated at a remote location, i.e., it may be placed in a separated area outside of the toll lane 10 to prevent traffic congestion.

Figure 5:
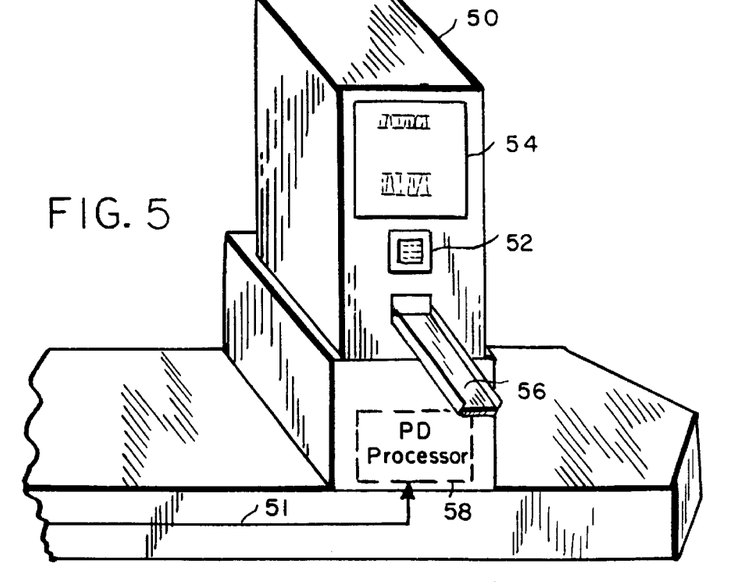
FIG. 5 is an illustration of a retail product dispenser.

The dispenser 50 is depicted in FIG. 5. Although the dispensing mechanism employed is based on vending machine technology, it is modified to accommodate the requirements of this retailing environment. For example, it may include a signaling device (not shown) to instruct the driver as to when and to what point to proceed to in the service lane, one or more sensor devices (not shown) to detect vehicle configuration for product dispensing purposes, and a protective casing (not shown) to protect the dispenser against damage from passing vehicles and harmful elements, such as sand and salt.

In addition to the above-mentioned PD processor 58, the dispenser 50 includes a keypad 52 for entering information, a display 54 for presenting messages, and a delivery device 56 for dispensing the product within reach of the driver. The dispenser 50 holds a quantity of stock, and also contains an internal auditing system (not shown) that can detect low fill levels or other incipient problems within the dispenser 50. The driver is informed of any equipment problems via the display 54, which may also indicate the total charge to the ETC account. The PD processor 58 communicates this audit information to the OI processor 68. The OI processor 68 may pass the audit information to the lane controller 16 which may, in turn, pass the information to the plaza controller 18. The plaza controller 18 makes appropriate changes in the display of the electronic signage 12, and it may also forward this information to the central management computer 19.

In some configurations of the invention, especially in situations where the sequence of product order pick-up may be different from the sequence of product order placement, which may be the case when the dispenser 50 is remotely located from the ordering interface 60, the driver may be required to enter a personal identification number (PIN) into the keypad 52 to enable product dispensing, as indicated in step 424. This requirement may be imposed to prevent another person from deliberately or inadvertently picking up the order. In step 426, the dispenser 50 initiates delivery of the ordered product(s) at delivery device 56.

As mentioned above, the dispenser 50 includes an internal auditing system (not shown) for detecting equipment malfunctions and inventory levels with remote access to this information. If no equipment malfunctions have been detected at decision step 428, the dispenser 50 indicates that the transaction was successful by displaying an acknowledgment, such as a "Thank You" message, and the total charge on the display 54 in step 430. In step 432, the PD processor 58 transmits a confirmation message back to the OI processor 68.

If the internal auditing system has detected an equipment malfunction preventing the order from being filled in whole, or in part, at decision step 428, the dispenser 50 informs the driver of the problem and indicates the toll charge plus the charge for the deliverable items via the display 54 in step 431. The PD processor 58 also transmits a trouble report back to the OI processor 68 in step 433. In a situation where the ETC debit includes a charge for an item not delivered, or delivered in a defective condition, the driver may seek a refund in a procedure established by the operator of the automated retailing system. Due to the lack of an attendant and the requirement to maintain toll lane vehicle throughput, there is typically no recourse for the driver at the time and location of the transaction. The driver may be provided with a toll-free telephone number connecting to a customer service office. Alternatively, the driver may visit an operator web-site. In either case, the customer service office may perform an electronic credit to the driver's ETC account or issue a refund check.

In step 434, the driver picks up the order, or partial order, from the delivery device 56. In situations where the dispenser 50 is not available, steps 424 through 433 may be eliminated and a toll attendant may dispense the product order to the driver at step 434. In step 436, the OI processor 68 transmits the product charge to the lane controller 16. In step 438, the driver directs the vehicle 2 through the exit area 8 where a second axle audit mechanism 29 may be employed to detect the vehicle exit. In step 440, the ETC system debits the ETC account and closes the transaction.

If the ETC account number is not found valid in step 416, the lane controller 16 cancels the transaction and signals the driver by the indicator 14 of the invalid status of the ETC account in step 423. The gate mechanism 15 may also be employed to prevent vehicle exit from the toll station until payment is rendered. The driver should take the appropriate action required by the toll authority for vehicles having invalid ETC accounts.

Those skilled in the art will recognize that the steps of the above-described flow diagram, and those of other flow diagrams presented herein, may be modified without altering the true spirit and scope of the invention. For example, using inventory information and trouble reports previously received from the PD processor 58, the OI processor 68 may know at step 420 (i.e., prior to decision step 428) that the product order cannot be filled. In this case, the driver might be informed of the problem at step 422 and the next step executed in the flow would be step 438.

In situations where remote ordering is not preferred or available, the product order may be locally entered at the ordering interface 60. The ordering interface 60 is shown in detail in FIG. 6. Preferably, it is configured for driver entry of the order, although it may also be configured for toll attendant entry. It has a functionality that is very similar to the order/ETC transponder 31 and includes product selection buttons 62, display screens 64, a "transaction complete" button 66, and a "transaction cancel" button 67.

Figure 7A:
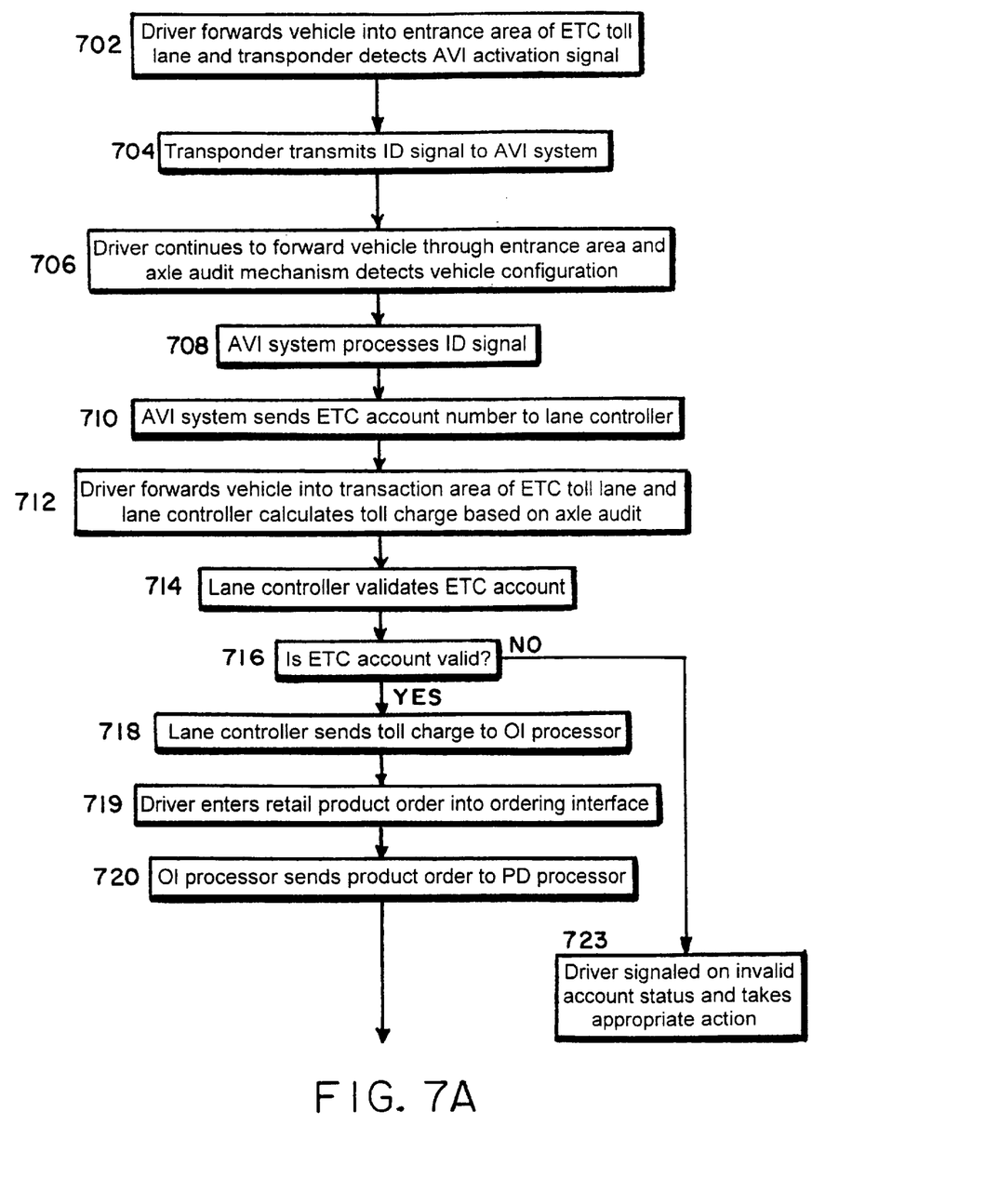
FIG. 7 is flow diagram of an automated retailing procedure for local order entry at an ETC toll lane.
Figure 7B:
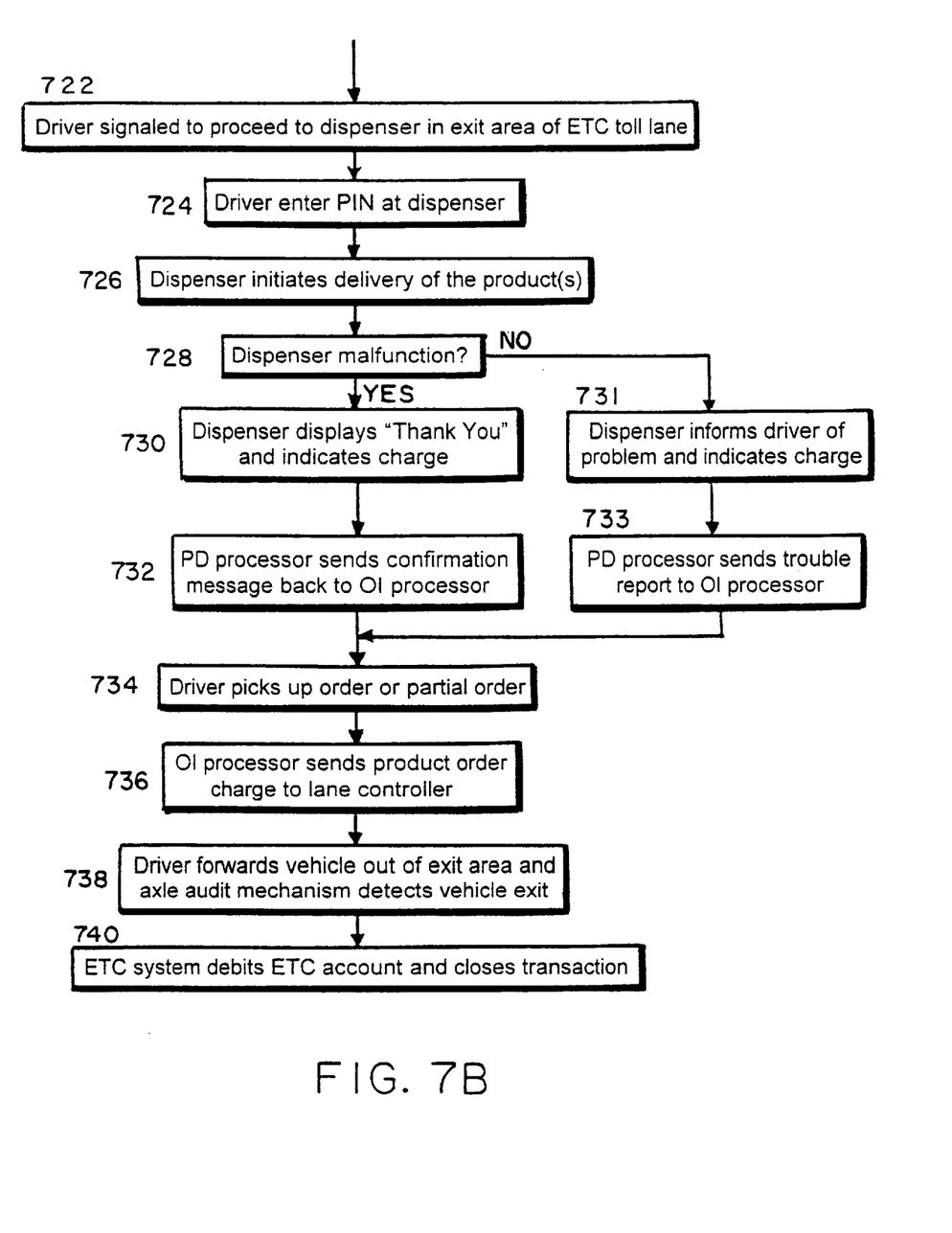

FIG. 7 is a flow diagram of the automated retailing procedure executed at the ETC toll lane 10 when the product order is locally entered via the order interface 60. In step 702, the driver forwards the vehicle 2 into the toll lane entrance area 4 and the transponder 30 detects the activation signal 26 transmitted by the AVI system. In step 704, the transponder 30 transmits an identification signal 27. In step 706, as the driver continues to forward the vehicle 2 through the entrance area 4, the first axle audit mechanism 28 is employed to detect vehicle entry and configuration. As noted above, the axle audit mechanism 28 may be a treadle, a light curtain, or similar vehicle detection mechanism known in the art. In the meantime, in step 708, the AVI transceiver 22 processes the identification signal 27 and, in step 710, forwards an ETC account number to the lane controller 16.

In step 712, as the driver forwards the vehicle 2 into the transaction area 6, the lane controller 16 calculates the toll charge based on vehicle configuration. In step 714, the toll lane controller 16 attempts to validate the ETC account number by comparing the number against a list of numbers having valid ETC accounts. If the ETC account number is found valid in decision step 716, the lane controller 16 forwards the ETC account number and the toll charge amount to the OI processor 68 in step 718. The driver, or toll attendant, may place an order at the ordering interface 60 by depressing the associated button 62 an appropriate number of times to reflect the desired quantity in step 719. The driver then confirms the order by depressing the "transaction complete" button 66. Depression of the "transaction cancel" button 67 clears the order out of memory and allows the driver to enter a new order or to cancel the order entirely. The itemized charges are indicated on the associated displays 64.

In step 720, the OI processor 68 transmits a dispenser control signal to the PD processor 58. The dispenser control signal identifies the products ordered and their quantities. In step 722, the driver is signaled via indicator 14 to proceed to the dispenser 50 located in the exit area 8.

As described above, the driver may be required to enter a PIN into the keypad 52 to enable product dispensing in step 724. In step 726, the dispenser 50 initiates delivery of the ordered product(s) at delivery device 56. If its internal auditing system has not detected a malfunction at decision step 728, the dispenser 50 displays a "Thank You" message and the total charge on the display 54 in step 730. In step 732, the PD processor 58 transmits a confirmation message back to the OI processor 68.

If the internal auditing system has detected an equipment malfunction preventing the order from being filled in whole, or in part, at decision step 728, the dispenser 50 informs the driver of the problem and indicates the toll charge plus the charge for the deliverable items via the display 54 in step 731. The PD processor 58 also transmits a trouble report back to the OI processor 68 in step 733. As discussed above, in a situation where the ETC debit includes a charge for an item not delivered, or delivered in a defective condition, the driver may seek a refund in a procedure established by the operator of the automated retailing system.

In step 734, the driver picks up the ordered product(s) off the delivery device 56. In situations where the dispenser 50 is not available, steps 724 through 733 may be eliminated and a toll attendant may dispense the product order to the driver at step 734. In step 736, the OI processor 68 transmits the product charge to the lane controller 16. In step 738, the driver directs the vehicle 2 through the exit area 8 where a second axle audit mechanism detects the vehicle exit. In step 740, the ETC system debits the ETC account and closes the transaction.

If the ETC account number is not found valid in decision step 716, the lane controller 16 cancels the transaction and signals the driver by the indicator 14 of the invalid status of the ETC account in step 723. The gate mechanism 15 may also be employed to prevent vehicle exit from the toll station until payment is rendered. Again, the driver should take the appropriate action required by the toll authority for vehicles having invalid ETC accounts.

The ETC toll lane 10 described above may be situated at a toll road, bridge or tunnel. However, those skilled in the art will recognize that the ETC toll lane 10 is readily adaptable for use at other types of tolls. For example, one or more ETC toll lanes 10 may be situated at the exit of a parking facility. In this case, the axle-auditing operation (steps 406 and 706) is replaced with a time-recording operation, and the toll charge calculation (steps 412 and 712) is based on park time rather than axle count. The plaza controller 18 may maintain a record of vehicle entry and departure times, and the entry time for a particular vehicle may be recorded on a toll ticket or similar device that is later submitted with the payment upon vehicle exit. Otherwise, the automated retailing procedure would perform essentially as described in the flow diagrams of FIG. 4 and FIG. 7.

Figure 6:
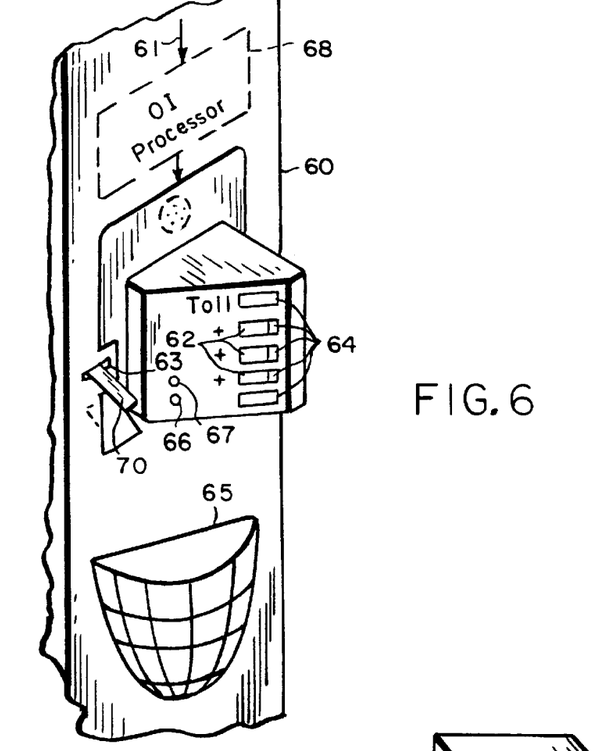
FIG. 6 is an illustration of an ordering interface.

Furthermore, those skilled in the art will recognize that a toll station need not be equipped with an automatic vehicle identification (AVI) system, and that an automated payment of the combined toll and product order charge may be accomplished by a variety of other methods. For example, the toll charge and product order charge may be recorded onto a toll ticket 70 (e.g., by a magnetic strip encoder (not shown)) that is issued to the driver at an ordering interface slot 63 and is later presented by the driver with the payment upon exit from the toll road; the driver may insert a credit card, a debit card, or a "smart" card device into a card reader (not shown) at the slot 63; the driver may deposit an appropriate amount of coins or tokens into a coin/token collector mechanism 65; or the driver may identify an account number using a transponder to communicate with a miniaturized AVI-type transceiver (not shown) that is incorporated into the ordering interface 60. In this last example, the transponder may transmit a consumer charge account, bank debit account or prepaid ETC account number. The transponder may also incorporate the remote ordering capability of the order/ETC transponder 31 described above. The account number may be validated using conventional methods.

The present invention offers several advantages over conventional retailing systems. Most importantly, the driver of the vehicle does not need to make an extra stop, or even exit from the vehicle, to purchase a refreshment, which is bundled with the primary transaction of a regular and necessary toll stop. Furthermore, the driver need not worry about the payment because it is automatically incorporated into the toll payment and, in most cases, need not be rendered at the time of the transaction. At the same time, the invention imposes a minimal burden upon the toll operator, because the retail product operator installs and maintains the retailing system and provides customer support. The toll operator need only provide a communications interface between the primary toll system and the ordering interface, and platform space for the ordering interface and product dispenser. On the other hand, the retail product operator enjoys the advantage of "piggy-backing" off of the primary toll system which provides a customer base and a mechanism for collecting payment.

The foregoing has been limited to specific embodiments of this invention. It will be apparent, however, that variations and modifications may be made to the embodiments, with the attainment of some or all of their advantages. Therefore, it is the object of the appended claims to cover all such variations and modifications as come within the true spirit and scope of the invention.

What is claimed is:

1. An automated retailing system wherein an occupant of a vehicle engages in a unified transaction at a toll station comprising of a payment of a toll and a purchase of one or more retail products; said toll having a toll charge and said purchase having an order charge, said system comprising:

A. means for entering a product order for said one or more retail products and calculating the order charge;

B. means for collecting the order charge and the toll charge in a unified payment, wherein the collecting means includes a mechanism for recording the order charge onto a toll ticket issued to the occupant, and wherein the occupant later presents the toll ticket together with the unified payment; and C. means for dispensing said one or more retail products as specified by the product order.

2. The automated retailing system of claim 1, wherein the collecting means further comprises a mean for receiving an account number, and wherein the collecting means collects the unified payment through a charge against an account identified by the account number.

3. The automated retailing system of claim 2, wherein a transponder carried within the vehicle transmits the account number in an identification signal, and wherein the receiving means comprises a transceiver for receiving and processing the identification signal.

4. The automated retailing system of claim 3, wherein said transponder has a remote ordering capability and further transmits the product order in a product order signal, and wherein said transceiver further receives and processes the product order signal.

5. The automated retailing system of claim 2, wherein the receiving means comprises a credit card reader for reading the account number from a credit card provided by the occupant.

6. The automated retailing system of claim 2, wherein the receiving means comprises a debit card reader for reading the account number from a debit card provided by the occupant.

7. The automated retailing system of claim 2, wherein the receiving means comprises a smart card reader for reading the account number from a smart card provided by the occupant.

8. The automated retailing system of claim 1, wherein the collecting means comprises a coin collection mechanism, and wherein the occupant presents the unified payment by depositing the appropriate number of coins and/or tokens into the mechanism.

9. An automated retailing system wherein an occupant of a vehicle engages in a unified transaction at a toll station comprising a payment of a toll and a purchase of one or more retail products; said toll having a toll charge and said purchase having an order charge, said system comprising:

A. an account identifying mechanism carried with the vehicle and holding an account number; and B. a vehicle transaction station, said vehicle transaction station comprising:

i. a receiving system for receiving and forwarding the account number;

ii. an ordering interface for receiving the account number, accepting a product order, adding the order charge to the toll charge to produce a total charge, applying the total charge against an account associated with the account number, and generating and transmitting a dispenser control signal to enable dispensing of the ordered retail products to the occupant; and iii. a product dispenser for receiving the dispenser control signal and dispensing the ordered retail products.

10. The automated retailing system of claim 9, wherein the account identifying mechanism is a transponder for transmitting the account number in an identification signal, and wherein the receiving system comprises a transceiver for receiving and processing the identification signal.

11. The automated retailing system of claim 9, wherein the occupant of the vehicle places the retail product order through the account identifying mechanism.

12. The automated retailing system of claim 11, wherein the account identifying mechanism is a transponder for transmitting the account number in an identification signal and the product order in a product order signal, and wherein the receiving system comprises a transceiver for receiving and processing the product order and identification signals.

13. The automated retailing system of claim 9, wherein the account identifying mechanism is a credit card presented by the occupant, and wherein the receiving system comprises a card reader for reading the credit card to determine the account number.

14. The automated retailing system of claim 9, wherein the account identifying mechanism is a debit card presented by the occupant, and wherein the receiving system comprises a card reader for reading the debit card to determine the account number.

15. The automated retailing system of claim 9, wherein the account identifying mechanism is a smart card presented by the occupant, and wherein the receiving system comprises a smart card reader for reading the smart card to determine the account number.

16. An automated retailing system wherein an occupant of a vehicle engages in a unified transaction at a toll station comprising a payment of a toll and a purchase of one or more retail products; said toll having a toll charge and said purchase having an order charge, said system comprising:

A. an order mechanism carried with the vehicle and transmitting an identification signal and a product order signal, said identification signal identifying the number of a prepaid account and said product order signal specifying a product order for said one or more retail products; and B. a vehicle transaction station comprising:

i. a receiving system for receiving and possessing the identification and product order signals, and forwarding the prepaid account number and product order;

ii. an ordering interface for receiving the prepaid account number and product order, adding the order charge to the toll charge to produce a total charge; debiting the total charge to the prepaid account, and generating and transmitting a dispenser control signal to enable dispensing of the ordered retail products to the occupant; and iii. a product dispenser for receiving the dispenser control signal and dispensing the ordered retail products.

17. The automated retailing system of claim 16, wherein the order mechanism is a transponder.

* * * * *